Jan. 9, 1962 W. NICLAS ETAL 3,016,084
METHOD OF AND DEVICE FOR MAKING PNEUMATIC TIRES
Filed Feb. 12, 1958 2 Sheets-Sheet 1

Jan. 9, 1962 W. NICLAS ETAL 3,016,084
METHOD OF AND DEVICE FOR MAKING PNEUMATIC TIRES
Filed Feb. 12, 1958 2 Sheets-Sheet 2

United States Patent Office 3,016,084
Patented Jan. 9, 1962

3,016,084
METHOD OF AND DEVICE FOR MAKING PNEUMATIC TIRES
Walter Niclas, Altwarmbuchen, near Hannover, and Hans Menell, Ahlem, near Hannover, Germany, assignors to Continental Gummi-Werke Aktiengesellschaft, Hannover, Germany
Filed Feb. 12, 1958, Ser. No. 714,877
Claims priority, application Germany Feb. 15, 1957
12 Claims. (Cl. 156—123)

The present invention relates to a method of and device for placing the lateral rubber strips upon carcasses of pneumatic tires. More specifically, the present invention relates to a method of and device for placing the lateral rubber strips upon the carcass while employing a tire building drum in which the mean diameter of the contact surfaces for the bead portions of the tire is less than that of the contacting surfaces for the zenith portion of the tire carcass. The build-up of the tire is thus, in contrast to the customary cylindrical drums employed with the so-called flat band method, effected on high shoulder drums or the like or so-called core rings which already during the mounting of the individual parts impart thereupon a cross-sectional shape which is characteristic for the respective tire.

It is an object of the present invention to provide an improved method and simplified device for placing lateral rubber strips upon the carcass of pneumatic tires, which will make it possible to employ relatively thin-walled lateral rubber strips.

It is a further object of this invention to provide a method of and device for placing lateral rubber strips upon the carcass of pneumatic tires, which will result in a smooth merging between the lateral rubber strips and the tread layer.

These and other objects and advantages of the present invention will appear more clearly from the following specification in connection with the accompanying drawing illustrating partly in section and partly in elevation a device for placing the lateral rubber strips upon the carcass of a pneumatic vehicle tire.

Figure 1:
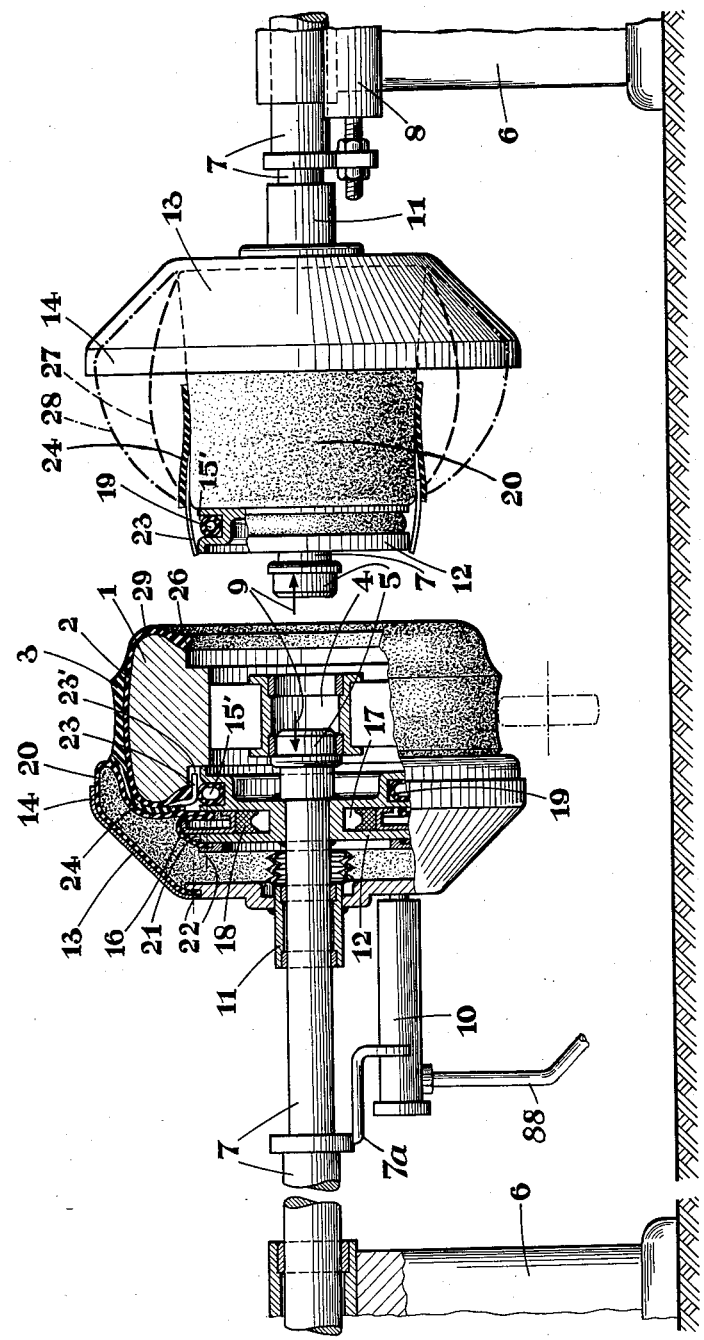
Figure 2:
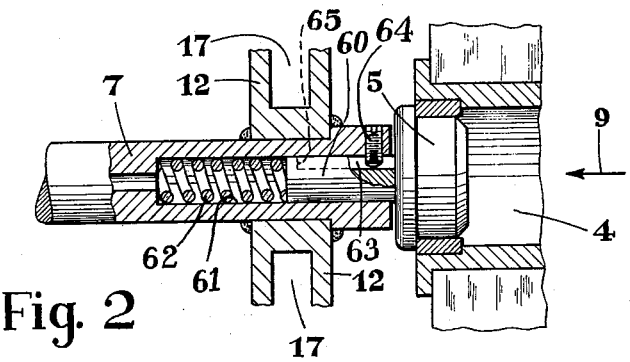
Figure 3:
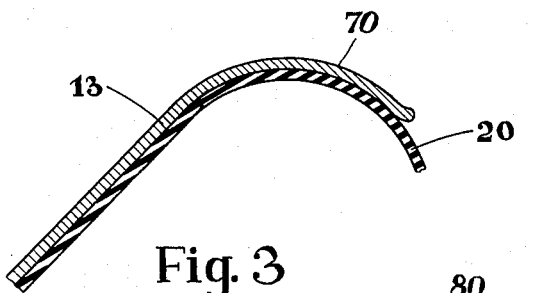
Figure 4:
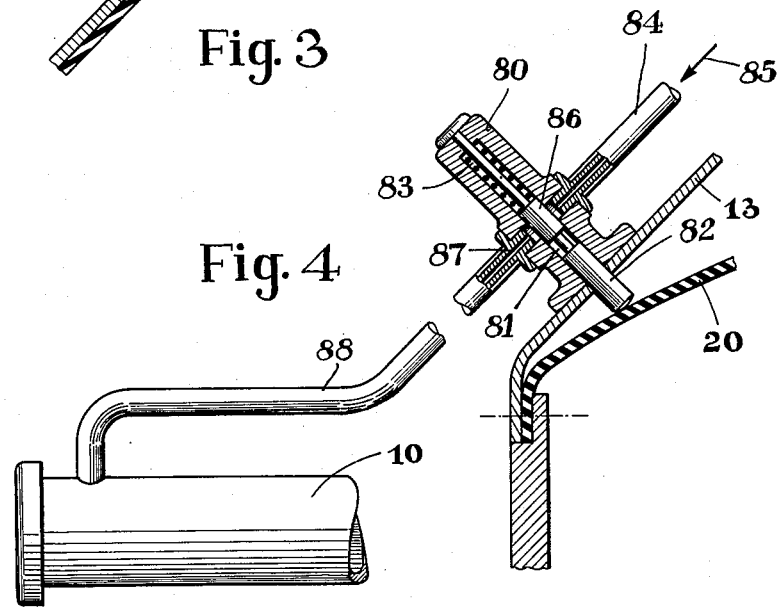

In the drawings:
FIGURE 1 shows an elevational view of the device with a portion in section.
FIGURE 2 is a fragmentary sectional view showing a detail of the support for the tire drum.
FIGURE 3 is a detail sectional view illustrating a modified form of the cage.
FIGURE 4 is a view of a control mechanism which is used with the apparatus of FIGURE 1, a part being shown in section.

*General arrangement*

In conformity with the present invention, the rubber strip to be placed upon the lateral portion of the carcass is first formed to a hollow cylindrical body. Thereupon, the said body is at least over a portion of its width increased in diameter and then placed upon the lateral portion of the carcass. Such a method is particularly advantageous because with the manufacture of tires on high shoulder drums or the like, relatively thin-walled lateral rubber strips may be employed. Due to the stretching of the rubber tire as a result of the increase in the diameter, the wall thickness of the rubber strip decreases particularly within that range which is adjacent to the tread layer already placed upon the carcass. As a result thereof, a desirable smooth merging of the lateral rubber strips with the tread layer will be obtained. These advantages are of importance because the manufacture of thin-walled rubber strips for resting upon the side portions of the carcass is rather difficult. If desired, one edge of said rubber strip may be sharp edged or tapered. Even if the manufacture of such rubber strips would be successful, there still exists the danger of damage and formation of folds during the placing process which danger and formation of folds will be excluded by the present invention.

The method according to the invention may be carried out by means of an inflating body which in non- or only partly inflated condition has a cylindrical or nearly cylindrical mantle serving as resting surface for the lateral rubber strips and adapted during the increase in the inner pressure to act upon the lateral surfaces of the tire building drum or those portions of the carcass mounted thereupon. Advantageously, that end of the inflating body which is adjacent the drum is fixedly mounted on the drum, whereas that end of the inflating body which is remote from the drum is movable in the direction toward the drum so that with the lateral rubber strips placed on the carcass and with the now effected increase in the inflating pressure, that edge portion of the inflating body which is remote from the drum will be able automatically to move in the direction toward the drum or may be moved by separate devices in the said direction. It is furthermore expedient to surround that end of the inflating body which is remote from the drum by a cage or the like of truncated cone-shaped form, the greatest inner diameter of which will be adjacent to the drum. This cage serves as protective device if the inflating body should be damaged or burst and in addition thereto also serves for clamping-in that end of the lateral rubber strip which is remote from the drum, the edge portion of the lateral rubber strip being clamped-in between the inflating body and the cage.

*Structural arrangement*

Referring now to the drawing in detail, the structure illustrated therein comprises a high shoulder drum 1 having mounted thereon the tire carcass 2 with the tread layer 3. The drum 1 is supported by mandrels 5 adapted to engage the bore 4 of the drum 1. The mandrels 5 engage tubes 7 mounted on bearing supports 6. The arrangement is such that each tube 7 together with all parts engaging the same is adapted longitudinally to be displaced relative to the respective support 6 by means of a cylinder piston system 8. Rings 12 are provided as an abutment, said rings being adapted to engage drum 1. This arrangement makes it possible to employ drums of different width without the necessity of effecting a change in the machine.

The mandrels 5 are telescopically mounted in tubes 7 and reciprocate therein and are expediently under the influence of pressure springs, indicated at 62 in FIG. 2, which are arranged within the tubes 7 and continuously urge the mandrels 5 to move outwardly of tubes 7 so that the mandrels 5 will be pressed against the hub of the drum and, therefore, will occupy the position shown in the left half of the drawing. A movement of the mandrels 5 in the direction of the arrow 9 will, therefore, be possible only against the thrust of said springs.

The mandrels 5 which, for purposes of supporting the high shoulder drum 1 are introduced into the drum bore 4, are provided with a shank portion 60 which is slidable in a bore 61 of pipe 7. Portion 60 is acted upon by a compression spring 62 which continuously urges mandrel 5 to move out of bore 61. If, however, the high shoulder drum 1 is engaged by mandrels 5, springs 62 are prestressed so that drum 1 will be supported at both sides.

Shank portion 60 also comprises a longitudinal groove 63 engaged by a screw 64 connected to pipe 7. The longitudinal groove 63 extends merely over a portion of the length of shank portion 60 so that shank portion 60 together with mandrel 5 cannot be moved completely out of bore 61 by spring 62 when mandrel 5 is not introduced into the drum bore 4. In this condition, screw 64 engages the rear end 65 of longitudinal groove 63.

Tubes 7 have furthermore attached thereto by bracket means 7a a cylinder piston system 10 which forms means by which the supporting members 11 formed with sleeves slidably mounted on tubes 7 may be reciprocated thereon. The arrangement furthermore comprises cone-shaped cages 13 of sheet metal which widen in the direction toward the drum 1 and have their free outer ends provided with a cylindrical portion 14. These cages are fixed to the respective supporting members 11.

Each ring member 12 connected to the free end of adjacent tube 7 has two circumferential grooves 15, 15' of which groove 15 serves for receiving radially movable segments or pressing members 16 which are adapted to be moved radially outwardly by means of pressure fluid introduced into the fluid pressure means formed by the chamber 17 which latter is sealed by ring 18. The other groove 15' adjacent the drum 1 is filled with an elastically deformable annular hose 19 adapted to increase its outer diameter by introducing a pressure fluid thereinto. Each supporting member for each cage 13 has connected thereto the rear end of a substantially cylindrical inflatable body 20 having an extensible peripheral wall of rubber or the like. That end of the body 20 which is adjacent drum 1 is clamped against a first ring member 12 expediently in such a way that doubled portions of the inflatable body 20 form a marginal portion 21 which covers the segment 16. The other end of inflatable body 20 is clamped at 22 to the second ring member or supporting member 11 of the respective cage 13.

For purposes of placing lateral rubber strips against the side walls of the carcass, the rubber strips 24 are formed as continuous cylinders. To complete each side wall of the tire, first the belt cloth 23 is placed upon ring 12 and partly also upon the extensible inflatable body 20 while the latter is in its cylindrical shape so that the belt cloth 23 will embrace ring 12 and inflatable body 20. Thereupon the lateral rubber strip 24 in cylindrical form is placed upon the inflatable body 20 so that the latter is also embraced by and forms supporting means for the rubber strip 24. Tube 7 with supporting member 11 and ring member 12 is then moved in the direction toward the drum 1 so that ring member 12 and the hose 19 will be located below the bead portion 26 of the tire. By inflating the hose 19, the belt cloth 23 is pressed against the bead portion 26 whereupon by movement of the segments 16 outwardly, the edges of belt cloth 23 are caused to rest against those lateral surfaces of the carcass 2 which are adjacent the bead portion 26.

It will be obvious that the lateral rubber strip 24 and the belt cloth 23 may be assembled in a separate device so as to form a cylindrical hollow body. The thus formed body can then easily be slipped over the device (right hand portion of the drawing) according to the present invention.

The chamber confined by the inflatable body 20 is sealed air-tight toward the outside. The said chamber may contain a fluid under pressure such as compressed air if the inflatable body 20 has the cylindrical shape required for placement of the strip 24. After a considerable quantity of pressure fluid has been introduced into the chamber confined by the inflatable body 20, the inflatable body 20 will bulge toward the outside and first will assume a shape indicated by dash lines 27 in the drawing while the strip 23 is being extended.

Connected to cage 13 is a housing 80 which serves for a displaceable support of a feeler 82 provided with a recess 81, said feeler being adapted to be actuated by diaphragm 29 and to be moved against the thrust of pressure spring 83 in housing 80.

Housing 80 furthermore comprises a pressure fluid connection 84 adapted to receive the pressure fluid in the direction of the arrow 85. When the parts are in their FIG. 4 position, the pressure fluid will not pass through housing 80 because the cylindrical portion 86 blocks the passage through the housing.

Housing 80 is furthermore provided with a connection 87 for discharging the pressure fluid, said pressure fluid passing through conduit 88 to working cylinder 10.

If pressure fluid or the like is introduced into the chamber confined by the inflatable body 20, diaphragm 20 first contacts the front portion of feeler 82. If the pressure is further increased in the chamber of the inflatable body 20, a corresponding expansion of said inflatable body will take place while the feeler will be moved against the thrust of spring 83 further into housing 80. Further deformation of inflatable body 20 will bring recess 81 of feeler 82 into the range of the connections 84 and 87, so that pressure fluid may now pass into working cylinder 10 in the direction of arrow 85 through connections 84 and 87 and conduit 88 in such a way that an axial movement of cage 13 will be effected in the direction toward the high shoulder drum 1. The stroke of the cylinder 10 is so dimensioned that cage 13 and the parts firmly connected thereto will, in the end position of the working cylinder 10, occupy the position shown in FIG. 1 left portion thereof. During this sliding movement, during which the inflatable body 20 further bulges toward the outside, that end of the inflatable body 20 which is remote from drum 1 will gradually rest upon the inner surface of the cage 13 (see dot-dash line 28), whereas that edge of the strip 24 which is adjacent the cage 13 will be clamped-in between the inflatable body 20 and the cage 13 and will be fixed in this position. During the further movement of the cage 13 in the direction toward the drum, during which expediently the pressure within the inflatable body 20 is reduced, the lateral strip 24, which has been stretched so as to reduce its thickness and to conform to the side wall, will rest against the lateral portions 29 of the carcass 2. That portion of the strip 24 which is clamped-in between the inflatable body 20 and the edge 14 of the cage 13 can be released only by a reduction in pressure in the chamber confined by the inflatable body 20.

After the strip 24 has been placed against the lateral surfaces of the carcass, supporting member 11 is by means of cylinder 10 returned into its starting position according to the right hand side of the drawing. Consequently, also cage 13 is returned to its starting position so that the inflatable body 20 will again assume a substantially cylindrical shape. The clamping-in of that marginal portion of strip 24, which is adjacent cage 13, between the cage and the inflatable body 20 is by no means an indispensable requirement. If a suitable material is selected for the inflatable body 20 and if strip 24 can be held by adhesive friction, the above mentioned clamping-in step is not necessary. The lateral strip 24 may in such an instance be so dimensioned that when strip 24 is in its placed position, it will rest over its entire width against the lateral portions 29 and the thread strip 3.

If, however, the lateral strip 24 is clamped-in below the edge 14, the released edge of this strip will due to the preload therein tilt off in the direction toward the tire. However, if that upper portion of the lateral strip 24 which is adjacent the tread strip does not completely rest against the tire, it may subsequent to the placing of the lateral strip be rolled against the tire. This rolling-on step is advantageously effected by means of a friction wheel drive which latter acts upon the outer surface of the tread strip and in this way causes drum 1 to rotate with the unfinished tire thereon. The rolling step proper may be effected by tools known per se such as a roller disc, roller or the like. However, prior to initiating the rotative movement of the drum 1, the ring 12 with the parts mounted thereon has likewise to be moved in the direction toward the bearing supports 6 (cylinder piston system 8). However, only a relatively short axial movement of ring 12 is required in order to permit drum 1 to rotate freely.

The above mentioned springs which act upon the mandrels 5 are intended to bring about that the said mandrels will hold the drum therebetween also when ring 12 is moved in the direction toward the bearing supports 6 in order to be able to rotate the drum. If drum 1 has to be removed from the device, either the springs acting upon the mandrel 5 are released or the release of the mandrels will be effected through a retracting movement of tube 7 by actuation of the cylinder piston system 8.

After drum 1 has been released and the unfinished tire has been removed from the drum, also the inwardly protruding edges 23' of the belt cloths 23 are deposited against the inner surfaces of the bead portions 26.

Inasmuch as the movements of the parts 11 have to be effected in conformity with the outer surface of the inflatable body 20 or in conformity with the condition of the lateral strips 24, it is expedient to make these movements independent of the inflating pressure. It is advantageous by means of the above mentioned sensing device to ascertain the position of the inflating body 20 and then to initiate the various movements.

Instead of the cylindrical extension 14 of cage 13, the front end of the cage may alternatively be provided with a rounded portion 70 within the range of its maximum diameter as will be seen in FIG. 3.

It is, of course, to be understood that the present invention is, by no means, limited to the particular construction shown on the drawing but also comprises any modifications within the scope of the appended claims.

What we claim is:

1. In combination in a tire building apparatus: a high shoulder drum having an outer substantially tire-shaped contour including radially extending sides and being provided with a hub portion, a pair of mandrels arranged on opposite sides of said drum and relatively movable axially toward and away from each other for selectively engaging or disengaging said hub portion to support or release said drum respectively, and two inflatable bodies normally of substantially cylindrical contour and respectively supported by said mandrels on opposite sides of said drum for respectively receiving in cylindrical form on their circumferential surfaces the lateral rubber strips intended to form the side walls of the tire to be built, each of said inflatable bodies having one end adjacent a bead portion of a carcass on said drum when the mandrels engage the drum and the opposite end movable toward the said one end, means supported on each said opposite end and extending circumferentially of said body intermediate its ends to limit expansion of said body radially and axially away from said drum, and means for moving said opposite end of each inflatable body toward the drum whereby to press the inflatable bodies and the said rubber strips against the side walls of a carcass on said drum.

2. In combination in a time building apparatus: a high shoulder drum having an outer substantially tire-shaped contour and being provided with a hub portion, a pair of mandrels arranged on opposite sides of said drum and movable axially in respectively opposite directions for selectively engaging or disengaging said hub portion to support or release said drum respectively, two inflatable bodies normally of substantially cylindrical contour and respectively supported by said mandrels on opposite sides of said drum for respectively receiving on the ends thereof toward the drum and in cylindrical form the lateral rubber strips intended to form the side walls of the tire to be built, each of said inflatable bodies having the one end adjacent said drum arranged stationarily with regard to the respective mandrel carrying said inflatable body, two supporting members respectively displaceably mounted on said mandrels and supporting the other end portions of said inflatable bodies remote from said drum, two cage members respectively supported by said supporting members and increasing in diameter from said supporting members in the direction toward said drum and larger than said drum at their larger ends, said cage members forming an abutment for those portions of said inflatable bodies which are remote from the drum when the inflatable bodies are inflated while permitting the opposite portions of said inflatable bodies on which said strips are mounted to deform in conformity with the contour of the sides of the tire being built, and means respectively operatively connected to said dispaceable end portions of said inflatable bodies for displacing the same toward said drum, said opposite portions of said inflatable bodies being deformable so as to move and to exert a pressure in the direction toward the adjacent side wall of said drum to press a rubber strip on said opposite portions of said inflatable body against the respective side wall of said drum.

3. A tire building apparatus according to claim 2, in which said cage members having a cylindrical portion forming the largest diameter portion thereof.

4. In combination in a tire building apparatus: a high shoulder drum having an outer substantially tire-shaped contour and being provided with a hub portion, a pair of mandrels arranged on opposite sides of said drum and movable axially in respectively opposite directions for selectively engaging or disengaging said hub portion to support or release said drum respectively, spring means continuously urging at least one of said mandrels into engagement with said hub portion for supporting said drum, and two inflatable bodies normally of substantially cylindrical contour and respectively supported by said mandrels on opposite sides of said drum for respectively receiving in cylindrical form the lateral rubber strips intended to form the side walls of the tire to be built, a cage-like support member at the end of each inflatable body opposite the drum concave toward the drum and extending over a part of the axial length of the respective inflatable body, each of said inflatable bodies having an outer surface portion at the end toward said drum deformable by being pressed against the drum so as to move and to exert a pressure in the direction toward the adjacent side wall of said drum to press the rubber strip on said inflatable body against the respective side wall of said drum.

5. In combination in a tire building apparatus: a high shoulder drum having an outer substantially tire-shaped contour and being provided with a hub portion, a pair of mandrels arranged on opposite sides of said drum and movable axially respectively opposite directions for selectively engaging or disengaging said hub portion to support or release said drum respectively, two inflatable bodies normally of substantially cylindrical contour and respectively supported by said mandrels on opposite sides of said drum for respectively receiving lateral rubber strips in cylindrical form intended to form the side walls of the tire to be built, each of said inflatable bodies having one end of an outer surface portion facing said drum arranged stationarily with regard to the respective mandrel carrying said inflatable body and its opposite end displaceable toward and from said one end, two supporting members respectively displaceably mounted on said mandrels and supporting the other displaceable end portions of said inflatable bodies remote from said drum, said supporting members being concave toward said drum, means respectively operatively connected to said displaceable end portions of said inflatable bodies for displacing the same, each of said end portions of said inflatable bodies adjacent said one end facing said drum being deformable so as to move and to exert a pressure in the direction toward the adjacent side wall of said drum to press the rubber strip on said inflatable body against the respective side wall of said drum, and feeler means operatively connected with said last mentioned means and respectively adapted in response to a certain inflated condition of said inflatable bodies to cause said means which are respectively operatively connected to said displaceable end portions of said inflatable bodies to displace the same.

6. In combination in a tire building apparatus; a high shoulder drum having an outer substantially tire-shaped contour and being provided with a hub portion, a pair of mandrels arranged on opposite sides of said drum and movable axially in respectively opposite directions for selectively engaging or disengaging said hub portion to support or release said drum respectively, two inflatable bodies normally of substantially cylindrical contour and respectively supported by said mandrels on opposite sides of said drum for respectively receiving on the portions thereof toward said drum and in cylindrical forms the lateral rubber strips intended to form the side walls of the tire to be built, each of said inflatable bodies having an end adjacent said drum and having an opposite end movable toward the drum, each inflatable body being deformable so as to move and to exert a pressure in the direction toward the adjacent side wall of said drum to press the rubber strip on said inflatable body against the respective side wall of said drum when the inflatable body is expanded and said opposite end is moved toward the drum, cage members attached to the said opposite ends of said inflatable bodies concave toward the drum and larger in diameter than the drum at their larger ends and each extending axially over a substantial portion of the axial length of the pertaining inflatable body whereby to confine the end of the inflatable body opposite the drum when the inflatable body is expanded by fluid pressure, radially movable pressing members carried by each said mandrel inside the inflatable body thereon and engaging the wall of said inflatable body adjacent the drum end thereof, fluid pressure means to move said pressing members outwardly, the drum end of each said inflatable body being disposed adjacent the bead portion of a carcass on the drum when the mandrels engage the drum, said pressing members being radially movable by said fluid pressure means so that the pertaining inflatable body will press against the bead portion of the carcass on the drum, and means for moving the said cage members toward the drum when the inflatable bodies have been inflated whereby to press the inflatable bodies against the side walls of a carcass on the drum and thereby to press the rubber strips on the inflatable bodies against the side walls of the carcass.

7. In combination in a tire building apparatus; a high shoulder drum having an outer substantially tire-shaped contour and being provided with a hub portion, a pair of mandrels arranged on opposite sides of said drum and movable axially in respectively opposite directions for selectively engaging or disengaging said hub portion to support or release said drum respectively, two inflatable bodies normally of substantially cylindrical contour and respectively supported by said mandrels on opposite sides of said drum for respectively receiving on the portions thereof toward said drum and in cylindrical forms the lateral rubber strips intended to form the side walls of the tire to be built, each of said inflatable bodies having an end adjacent said drum and having an opposite end movable toward the drum, each inflatable body being deformable so as to move and to exert a pressure in the direction toward the adjacent side wall of said drum to press the rubber strip on said inflatable body against the respective side wall of said drum when the inflatable body is expanded and said opposite end is moved toward the drum, cage members attached to the said opposite ends of said inflatable bodies concave toward the drum and larger in diameter than the drum at their larger ends and each extending axially over a substantial portion of the axial length of the pertaining inflatable body whereby to confine the end of the inflatable body opposite the drum when the inflatable body is expanded by fluid pressure, radially movable pressing members carried by each said mandrel inside the inflatable body thereon and engaging the wall of said inflatable body adjacent the drum end thereof, fluid pressure means to move said pressing members outwardly, the drum end of each said inflatable body being disposed adjacent the bead portion of a carcass on the drum when the mandrels engage the drum, said pressing members being radially movable by said fluid pressure means so that the pertaining inflatable body will press against the bead portion of the carcass on the drum, and means for moving the said cage members toward the drum when the inflatable bodies have been inflated whereby to impress the inflatable bodies against the side walls of a carcass on the drum and thereby to press the rubber strips on the inflatable bodies against the side walls of the carcass, there being an annular groove in each mandrel between the drum end of the inflatable body thereon and the drum end of the mandrel, an annular expansible element in said groove, said groove being disposed immediately radially inwardly of the bead portion of a carcass on the drum when the respective mandrel engages the drum, said annular member being expansible into pressure engagement with the radially inner portion of said bead.

8. In combination in a tire building apparatus; a high shoulder drum having a hub portion, a mandrel on each side of the drum movable axially into selective engagement or disengagement with said portion, a cylindrical inflatable body on each mandrel, a first ring member fixed to each mandrel at the drum end thereof slightly smaller in diameter than the bead portion of a tire carcass on the drum sealingly connected with the adjacent end of the inflatable member, a second ring member slidably mounted on each mandrel and sealingly connected with the opposite end of the pertaining inflatable body, a support member carried by each said second ring member concave toward said drum and larger in diameter at its free end than said drum, means between each mandrel and the respective second ring member for moving the second ring member toward the drum so that upon inflation of the inflatable body and the said movement of the second ring member, the inflatable body will be pressed against the side wall of a carcass on the drum, annular grooves in the periphery of each said first ring member, one being radially inward of the wall of the inflatable body adjacent to the ring member and the other being outside the inflatable body, said other groove being positioned radially inwardly of the bead portion of a casing on the drum, the groove inside the inflatable body being in about the same plane as the side wall of the casing, and members in said grooves movable radially by fluid pressure and pressing outwardly on the wall of the body and on the bead of the carcass, respectively.

9. In a method of placing the lateral rubber strip for a tire side wall upon a tire carcass on a high shoulder tire building drum, in which the mean diameter of those drum surfaces which are intended for contact with the bead portions of the tire carcass is less than the mean diameter of the drum surfaces for contact with the zenith portion of the carcass, and the side walls of the carcass extend radially outwardly from the bead portions, the steps of: forming the rubber strip to form a side wall of the tire to be built up into a continuous, hollow substantially cylindrical body, supporting said strip on supporting means arranged coaxially of said drum with one edge of said strip adjacent the bead of the tire carcass, moving said supporting means within the opposite edge and intermediate portion of said strip radially outwardly and toward said carcass so as to increase the diameter of said cylindrical body at its opposite edge and over an intermediate portion of its width relative to said one edge so that said strip will extend radially outwardly from said bead portion and to press said strip against the radially extending side wall of said carcass so that the strip will conform to said side wall and will be extended circumferentially to decrease in thickness adjacent the thread portion of the carcass.

10. In combination in a tire building apparatus: a high shoulder drum having an outer substantially tire-shaped contour and being provided with a hub portion, a pair of mandrels arranged on opposite sides of said drum and movable axially in respectively opposite directions for selectively engaging or disengaging said hub portion to support or release said drum respectively, two inflatable bodies normally of substantially cylindrical contour and respectively supported by said mandrels on opposite sides of said drum for respectively receiving on the end thereof toward the drum and in cylindrical form the lateral rubber strips intended to form the side walls of the tire to be built, each of said inflatable bodies having the one end adjacent said drum arranged stationarily with regard to the respective mandrel carrying said inflatable body, two supporting members respectively displaceably mounted on said mandrels and supporting the other end portions of said inflatable bodies remote from said drum, a cage member fixed on each supporting member and concave toward the drum and extending over a portion of the axial length of the respective inflatable body and being larger in diameter than the drum at the free drum end thereof, and means respectively operatively connected to said displaceable end portions of said inflatable bodies for displacing the same, each of said inflatable bodies being inflatable so as to expand in its supporting member and toward said drum and being deformable upon movement of the supporting member toward the drum so as to conform to the adjacent side wall of said drum to press a rubber strip on said inflatable body against the respective side wall of said drum.

11. In combination in a tire building apparatus: a high shoulder tire building drum having radially extending sides shaped to receive a tire carcass having bead portions, a tread portion and radially extending side walls, a mandrel extending coaxially of said drum, means mounted on said mandrel forming an inflatable body having a normally cylindrical peripheral wall of extensible material with one end substantially inextensible adjacent the tire bead portion of said drum, said cylindrical wall being adapted to receive a continuous, substantially cylindrical strip of extensible material with one edge adjacent said substantially inextensible end and its opposite edge positioned intermediate the ends of said cylindrical wall so that inflation of said chamber will increase the intermediate circumference of said normally cylindrical wall and thereby increase the diameter of a portion of said strip relative to said one edge and decrease the thickness adjoining said opposite edge, and means movable toward said drum to press said peripheral wall when expanded with said strip thereon against the side wall of a carcass on said drum, said means including means extending radially to exert axial force on said body directed toward said drum and extending circumferentially about said peripheral wall to limit the increase in circumference of said peripheral wall so that said strip extends radially outwardly and conforms to said radially extending side wall with said one edge adjacent the bead portion and said opposite edge of decreased thickness adjacent said tread portion.

12. In a method of placing the lateral rubber strip for a tire side wall upon a tire carcass on a high shoulder tire building drum, in which the mean diameter of those drum surfaces which are intended for contact with the bead portions of the tire carcass is less than the mean diameter of the drum surfaces for contact with the zenith portion of the carcass, and the side walls of the carcass extend radially outwardly from the bead portions, the steps of: forming the rubber strip to form a side wall of the tire to be built up into a continuous, hollow substantially cylindrical body, supporting said strip in cylindrical form on an inflatable body having an extensible normally cylindrical peripheral wall, the ends of said body being inextensible and movable toward each other, one edge of said strip and one end of said body being positioned adjacent the bead of the tire carcass, and the opposite edge of said strip being intermediate the ends of said chamber, expanding said cylindrical wall intermediate its ends so as to increase the diameter of the opposite edge of said strip and its intermediate portion, so that said strip will extend radially outwardly from said bead portion, pressing the end of said body remote from said bead and the adjacent portion of said peripheral wall toward the end adjacent said bead and thereby causing the fluid pressure to press said peripheral wall and said strip against the side wall of said carcass, so that the strip will conform to said side wall and will be extended circumferentially to decrease in thickness adjacent the tread portion of the carcass.

References Cited in the file of this patent

UNITED STATES PATENTS

| | | |
|---|---|---|
| 2,251,904 | Breth | Aug. 12, 1941 |
| 2,565,071 | Frazier | Aug. 21, 1951 |
| 2,567,064 | Frazier | Sept. 4, 1951 |
| 2,715,931 | Frazier | Aug. 23, 1955 |
| 2,717,628 | Wikle | Sept. 13, 1955 |